United States Patent
Chen et al.

(10) Patent No.: US 10,419,662 B2
(45) Date of Patent: Sep. 17, 2019

(54) PHOTOGRAPHING METHOD FOR INTELLIGENT FLIGHT DEVICE AND INTELLIGENT FLIGHT DEVICE

(71) Applicant: Beijing Xiaomi Mobile Software Co., Ltd., Beijing (CN)

(72) Inventors: Tao Chen, Beijing (CN); Ke Wu, Beijing (CN); Jin Han, Beijing (CN); Huayijun Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/864,790

(22) Filed: Jan. 8, 2018

(65) Prior Publication Data

US 2018/0213146 A1  Jul. 26, 2018

(30) Foreign Application Priority Data

Jan. 23, 2017  (CN) .......................... 2017 1 0049939

(51) Int. Cl.
*H04N 5/232* (2006.01)
*B64C 39/02* (2006.01)
*G03B 15/00* (2006.01)

(52) U.S. Cl.
CPC ....... *H04N 5/23222* (2013.01); *B64C 39/024* (2013.01); *G03B 15/006* (2013.01);
(Continued)

(58) Field of Classification Search
CPC ............... H04N 5/23222; H04N 5/232; H04N 5/23203; B64C 39/024; B64C 2201/127; B64C 2201/141; G03B 15/006
See application file for complete search history.

(56) References Cited

U.S. PATENT DOCUMENTS 5,211,172 A * 5/1993 McGuane ................ A47C 1/14
                                                    297/217.3
5,684,851 A  11/1997 Kurbatov
(Continued)

FOREIGN PATENT DOCUMENTS

CN  102694963 A  9/2012
CN  205186521 U  4/2016
(Continued)

OTHER PUBLICATIONS

International Search Report and Written Opinion issued in corresponding International Application No. PCT/CN2017/096530, dated Nov. 3, 2017, 5 pages.
(Continued)

*Primary Examiner* — Michael E Teitelbaum
(74) *Attorney, Agent, or Firm* — Arch & Lake LLP

(57) ABSTRACT

A photographing method for an intelligent flight device and an intelligent flight device are provided in the technical field of electronic devices. The method includes: determining a light source angle, where the light source angle is an angle between a current beam direction of a target light source and a vertical direction, the target light source is a light source capable of generating a shadow of the intelligent flight device, and the vertical direction is a direction perpendicular to a horizontal plane; according to the light source angle, determining a position of a shadow on the horizontal plane; and shooting a picture or a video based on a current photographing angle of the intelligent flight device and the position of the shadow.

11 Claims, 4 Drawing Sheets

(52) U.S. Cl.
CPC ......... *H04N 5/232* (2013.01); *H04N 5/23203* (2013.01); *B64C 2201/127* (2013.01); *B64C 2201/141* (2013.01)

(56) References Cited

U.S. PATENT DOCUMENTS

| | | | |
|---|---|---|---|
| 9,639,960 B1 * | 5/2017 | Loveland | G01C 11/02 |
| 9,676,480 B2 | 6/2017 | Hsiao | |
| 2003/0234341 A1 * | 12/2003 | Osborn | G01C 21/02 |
| | | | 250/203.4 |
| 2016/0280397 A1 | 9/2016 | Christ et al. | |
| 2016/0299504 A1 | 10/2016 | Hsiao | |
| 2018/0210466 A1 * | 7/2018 | Weaver | G05D 1/104 |

FOREIGN PATENT DOCUMENTS

| | | |
|---|---|---|
| CN | 106125767 A | 11/2016 |
| CN | 106973218 A | 7/2017 |
| JP | 2001016559 A | 1/2001 |
| JP | 2008199525 A | 8/2008 |
| RU | 2098797 C1 | 12/1997 |
| RU | 2498378 C1 | 11/2013 |
| RU | 2584368 C1 | 5/2016 |
| WO | 2008075335 A1 | 6/2008 |
| WO | 2017203646 A1 | 6/2018 |

OTHER PUBLICATIONS

International Search Report (including English translation) issued in corresponding International Application No. PCT/CN2017/096530, dated Nov. 3, 2017, 6 pages.
Russian Office Action issued in corresponding RU Patent Application No. 2017134749, dated Aug. 30, 2018, 14 pages.
Notification of Reasons for Refusal issued in corresponding Japanese Application No. 2017-552164, dated Feb. 12, 2019, 4 pages.

* cited by examiner

PHOTOGRAPHING METHOD FOR INTELLIGENT FLIGHT DEVICE AND INTELLIGENT FLIGHT DEVICE

CROSS-REFERENCE TO RELATED APPLICATION

The present application is based upon and claims priority to Chinese Patent Application No. 201710049939.0, filed Jan. 23, 2017, the entire contents of which are incorporated herein by reference.

TECHNICAL FIELD

The present disclosure relates to the technologies of electronic devices, and more particularly, to a photographing method for an intelligent flight device and the intelligent flight device.

BACKGROUND

As with fast-developing technologies of electronic devices, various intelligent flight devices emerge, for example, unmanned aerial vehicle including at least one camera, which can fly to a great height to photograph scenes and objects on the ground under control of devices such as a remote control.

However, in practical applications, when photographing is conducted using an intelligent flight device under an environment where there is a light source, the light rays emitted from the light source may be partially blocked by the intelligent flight device to generate a shadow. For example, when the photographing is conducted using a unmanned camera in a sunny day, due to the illumination of the sun, a shadow of the unmanned camera may be generated on the ground, and under such situation the generated shadow is inclined to be incorporated into the photographed pictures or videos.

SUMMARY

In order to solve the problems in the related art, the present disclosure provides a photographing method for an intelligent flight device and an intelligent flight device.

According to a first aspect of the present disclosure, there is provided a photographing method for an intelligent flight device. The method may include: determining a light source angle, where the light source angle is an angle between a current beam direction of a target light source and a vertical direction, the target light source is a light source capable of generating a shadow of the intelligent flight device, and the vertical direction is a direction perpendicular to a horizontal plane; according to the light source angle, determining a position of a shadow on the horizontal plane; and shooting a picture or a video based on a current photographing angle of the intelligent flight device and the position of the shadow so that the shadow is outside of the picture or the video.

According to a second aspect of the present disclosure, there is provided an intelligent flight device. The intelligent flight device includes: a processor; and a memory for storing instructions executable by the processor. The processor is configured to: determine a light source angle, where the light source angle is an angle between a current beam direction of a target light source and a vertical direction, the target light source is a light source capable of generating a shadow of the intelligent flight device, and the vertical direction is a direction perpendicular to a horizontal plane; according to the light source angle, determine a position of a shadow on the horizontal plane; and perform photographing based on a current photographing angle of the intelligent flight device and the position of the shadow.

According to a third aspect of the present disclosure, there is provided a non-transitory computer-readable storage medium having stored therein instructions that, when executed by a processor of an intelligent flight device, causes the intelligent flight device to perform a photographing method. The method includes at least following acts: determining a light source angle, where the light source angle is an angle between a current beam direction of a target light source and a vertical direction, the target light source is a light source capable of generating a shadow of the intelligent flight device, and the vertical direction is a direction perpendicular to a horizontal plane; according to the light source angle, determining a position of a shadow on the horizontal plane; and shooting a picture or a video based on a current photographing angle of the intelligent flight device and the position of the shadow.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Prior to detailed description of embodiments of the present disclosure, the application scenarios of embodiments of the present disclosure will be described first. In related arts, when photographing is conducted using an intelligent flight device under an environment where there is a light source, the light rays emitted from the light source will be blocked by the intelligent flight device to generate a shadow, and under such condition the generated shadow is inclined to be incorporated into the photographed pictures or videos, which may influence the quality of photographing. In view of this, embodiments of the present disclosure provide a photographing method for an intelligent flight device which is capable of avoiding incorporation of the shadow into the photographed pictures or videos and thus improving the quality of photographing. The photographing method for an intelligent provided by embodiments of the present disclosure may be executed by the intelligent flight device which may be an unmanned camera and the like.

Figure 1:
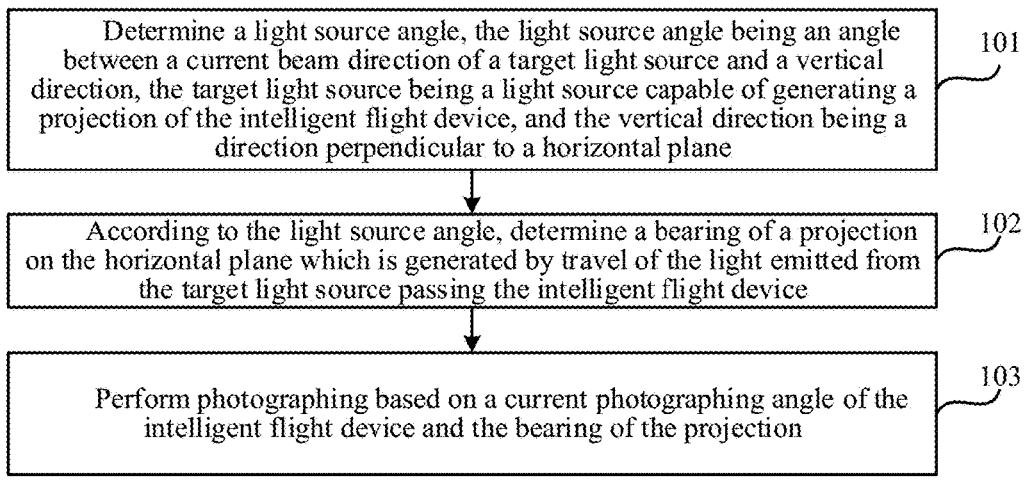
FIG. 1 is a flow chart of a photographing method for an intelligent flight device according to an aspect of the disclosure.

FIG. 1 is a flow chart of a photographing method for an intelligent flight device according to an aspect of the disclosure. The intelligent flight device may include an unmanned aerial vehicle (UAV), which may also be referred as a drone. As shown in FIG. 1, the photographing for an intelligent flight device may include the following steps.

In step 101, a light source angle is determined. The light source angle is an angle between a current beam direction of a target light source and a vertical direction, the target light source is a light source capable of generating a shadow of the intelligent flight device, and the vertical direction is a direction perpendicular to a horizontal plane. Here, the vertical direction may be the same as the direction of the gradient of the gravity field at the center of the intelligent flight device. Accordingly, the horizontal plane is a plane that is perpendicular to the gradient of the gravity field at the center of the intelligent flight device.

In step 102, according to the light source angle, a position of the shadow of the intelligent flight device on the horizontal plane is determined, where the shadow is generated by when the light emitted from the target light source is at least partially blocked by the intelligent flight device.

In step 103, photographing is performed based on a current photographing angle of the intelligent flight device and the position of the shadow so that the shadow is outside of the picture or the video. Here, the intelligent flight device may adjust its view angle to shoot a picture or record a video so that the shadow of the intelligent device is invisible in the picture or video.

In the embodiment of the present disclosure, an angle between a current position of a target light source which is a light source capable of generating a shadow of an intelligent flight device and a vertical direction is determined; according to the determined angle, a position of a shadow on the horizontal plane can be determined. Since the position of the shadow is determined, photographing can be performed based on a current photographing angle of the intelligent flight device and the position of the shadow. Thus, the technical solutions in the embodiment can avoid incorporation of the shadow into the photographed pictures or videos, thereby improving the quality of photographing.

Optionally, the determining the light source angle includes any one of:

determining, based on a plurality of first preset angles, a plurality of light intensities by use of a configured light sensor and determining a first preset angle corresponding to a maximum light intensity as the light source angle, wherein the plurality of first preset angles correspond to the plurality of light intensities one to one; and determining, based on a plurality of second preset angles, a plurality of exposures, and determining a second preset angle corresponding to a maximum exposure as the light source angle, wherein the plurality of second preset angles correspond to the plurality of exposures one to one.

Optionally, the determining the position of the shadow on the horizontal plane according to the light source angle, includes:

when the light source angle is equal to zero, determining that the shadow on the horizontal plane is right below a current position of the intelligent flight device; and when the light source angle is not equal to zero, determining a flight height, and according to the light source angle and the flight height, determining the position of the shadow on the horizontal plane, where the flight height is a current height of the intelligent flight device from the horizontal plane.

Optionally, shooting a picture or a video based on the current photographing angle of the intelligent flight device and the position of the shadow, includes:

based on the current photographing angle and the position of the shadow, determining whether the position of the shadow is within a photographing range;

when the position of the shadow is within the photographing range and is right below the current position of the intelligent flight device, shooting a picture or a video downwards in the vertical direction to obtain a photographed picture;

by performing a preset image process on the photographed picture, determining a size of the intelligent flight device in the photographed picture;

based on the size of the intelligent flight device in the photographed picture and the flight height, determining a rotation angle which is an angle for avoiding the shadow; and shooting a picture or a video based on the rotation angle.

Optionally, determining whether the position of the shadow is within the photographing range based on the current photographing angle and the position of the shadow, includes:

when the position of the shadow is within the photographing range and the light source angle is not equal to zero, determining a target direction according to the position of the shadow, wherein the target direction is any direction other than an direction in which the position of the shadow is;

determining, from a plurality of preset shadow ranges, a preset shadow range corresponding to a shadow distance, wherein the shadow distance is a horizontal distance between the position of the shadow and the intelligent flight device;

determining, from a plurality of preset rotation angles, a preset rotation angel corresponding to the preset shadow range, wherein the plurality of preset rotation angles correspond to the plurality of preset shadow ranges one to one;

wherein shooting a picture or a video based on the current photographing angle and the position of the shadow includes:

shooting a picture or a video based on the target direction and the preset rotation angle corresponding to the preset shadow range with the shadow distance.

All of the above optional technical solutions can be combined with each other arbitrarily to constitute an alternative embodiment of the present disclosure, and embodiments of the present disclosure do not intend to describe one by one.

Figure 2A:
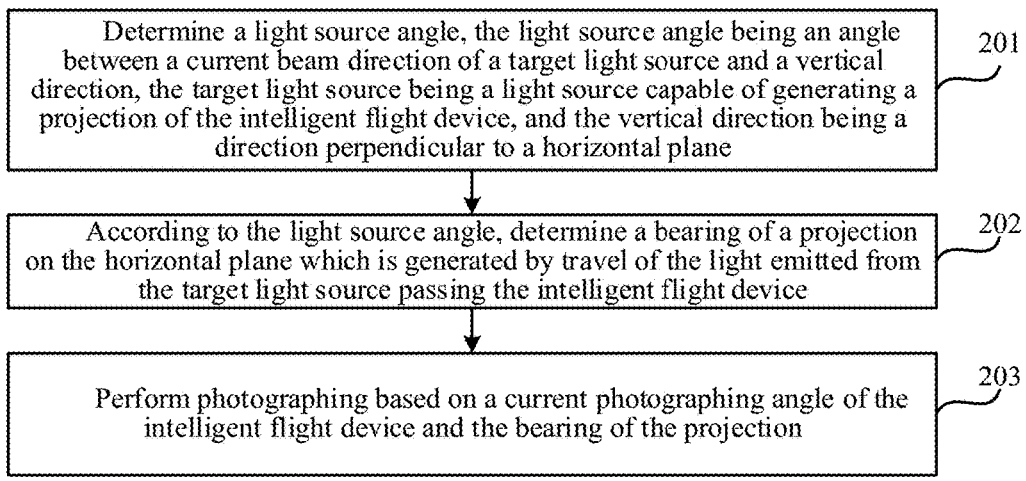
FIG. 2A is a flow chart of a photographing method for an intelligent flight device according to another aspect of the disclosure.

FIG. 2A is a flow chart of a photographing method for an intelligent flight device according to another aspect of the disclosure. As shown in FIG. 2A, the photographing method for an intelligent flight device may be applied in an intelligent control device. The photographing method for an intelligent flight device may include the following steps.

In step 201, a light source angle is determined. The light source angle is an angle between a current beam direction of a target light source and a vertical direction, the target light source is a light source capable of generating a shadow of the intelligent flight device, and the vertical direction is a direction perpendicular to a horizontal plane.

Figure 2B:
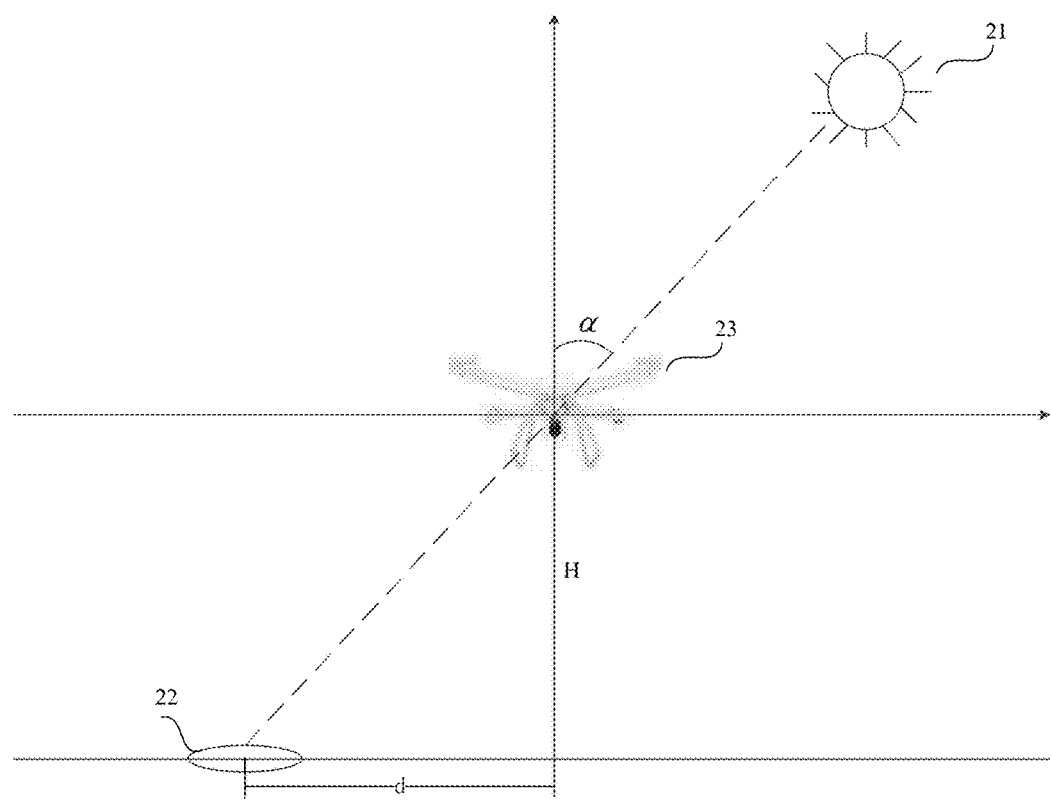
FIG. 2B is a schematic diagram showing an implementation environment involved in the photographing method for an intelligent flight device as shown in FIG. 2A.

The target light source may include the sun, or a lighting device and the like, and embodiments of the present disclosure do not impose specific limitations on this. For example, referring to FIG. 2B, the target light source in FIG. 2B is the sun 21, and the angle between the current position of the target light source 21 and the vertical direction is α, i.e., the light source angle is α. The determination of the light source angle may be realized by use of any one of the following approaches:

In a first approach, based on a plurality of first preset angles, a plurality of light intensities are determined by use of a configured light sensor and a first preset angle corresponding to a maximum light intensity is determined as the light source angle. The plurality of first preset angles correspond to the plurality of light intensities one to one.

The intelligent flight device may be provided with a light sensor. It is easy to understand that only when the height of the target light source from the horizontal plane is higher than the height of the intelligent flight device from the horizontal plane, the target light source may generate a shadow of the intelligent flight device. Thus, in a possible implementation, the light sensor may be provided at the top of the intelligent flight device and can be rotated so as to collect the light emitted from the light source based on the plurality of first preset angles.

Each of the plurality of first preset angles may be set by users according to actual needs, or may be set by the intelligent flight device by default, and embodiments of the present do not impose limitations on this.

For example, the plurality of first preset angles may be preset angles of 30 degrees, 60 degrees, 90 degrees, −30 degrees and −60 degrees with respect to the vertical direction. To put another way, the intelligent flight device may collect light rays every 30 degrees by use of the light sensor to obtain the plurality of light intensities corresponding to the plurality of first preset angles.

The higher a light intensity is, the closer the first preset angle corresponding to the light intensity gets to directly pointing to the target light source, i.e., the closer the first preset angle corresponding to the light intensity approaches the angle between the position of the target light source and the vertical direction. Thus, after obtaining the plurality of light intensities, the intelligent flight device determines from the plurality of light intensities a maximum light intensity, and determines a first preset angle corresponding to the maximum light intensity as the light source angle.

In a second approach, based on a plurality of second preset angles, a plurality of exposures are determined, and a second preset angle corresponding to a maximum exposure is determined as the light source angle. The plurality of second preset angles correspond to the plurality of exposures one to one.

In practical implementations, the intelligent flight device may collect light rays based on a plurality of second preset angles by means of a camera device of the intelligent flight device to determine a plurality of exposures. The higher an exposure is, the closer the second preset angle corresponding to the exposure approaches the angle between the position of the target light source and the vertical direction. The second preset angle corresponding to the maximum exposure is determined as the light source angle.

Each of the plurality of first preset angles may be set by users according to actual needs, or may be set by the intelligent flight device by default, and embodiments of the present do not impose limitations on this.

It should be noted that the above two approaches for determining the light source angle are examples. In alternative embodiments, other approaches may be used to determine the light source angle. For example, any one of the following may be used.

In a third approach, if the target light source is the sun, the intelligent flight device determines position information regarding the current position of the intelligent flight device using a positioning function and obtains a system time point; based on the position information and the system time point, the intelligent flight device obtains from a designated server a sun rising angle corresponding to the position information and the system time point. The sun rising angle is an angle between the sun and the horizontal plane, and a difference between 90 degrees and the sun rising angle is determined as the light source angle. The designated server stores a correspondence relationship of system time points and position information versus sun rising angles.

In the approach, the intelligent flight device may determining the position information regarding the current position of the intelligent flight device and the system time point using a positioning technology such as Global Positioning System (GPS), and then the intelligent flight device sends to the designated server a light source angle obtaining request which carries the position information and the system time point. After receiving the light source angle obtaining request, the designated server extracts from the light source angle obtaining request the position information and the system time point, and obtains the sun rising angle corresponding to the position information and the system time point from the pre-stored correspondence relationship of system time points and position information versus sun rising angles, and sends the determined sun rising angle to the intelligent flight device. Because the sun rising angle can be approximately deemed as the angle between the intelligent flight device and the horizontal plane, the intelligent flight device determines the angle obtained by subtracting the sun rising angle from 90 degrees as the light source angle.

In a fourth approach, the light source angle is determined by capturing a shadow of an object which is of a dimension the same with that of the intelligent flight device.

In the approach, the intelligent flight device may photograph an object and the shadow of the object. The object is within the same space with the intelligent flight device and at the same height with the intelligent flight device. The intelligent flight device may determine the light source angle according to the shadow of the object and the current flight height of the intelligent flight device. Specifically, the determination of the light source angle may be based on the pythagorean theorem of a triangle, and detailed descriptions will be omitted here.

It should be noted that in the above embodiments the light source angle is determined by the intelligent flight device, and in alternative embodiments, an intelligent terminal or a smart terminal which is associated with the intelligent flight device may obtain the light source angle and then send the light source angel to the intelligent flight device, and embodiments of the present disclosure do not impose specific limitations on this.

In step 202, according to the to the light source angle, a position of a shadow on the horizontal plane is determined.

Depending on the light source angle, the position of the shadow on the horizontal plane may be determined using the following approaches.

In a first approach, when the light source angle is equal to zero, it is determined that the shadow on the horizontal plane is right below a current position of the intelligent flight device.

Figure 2C:
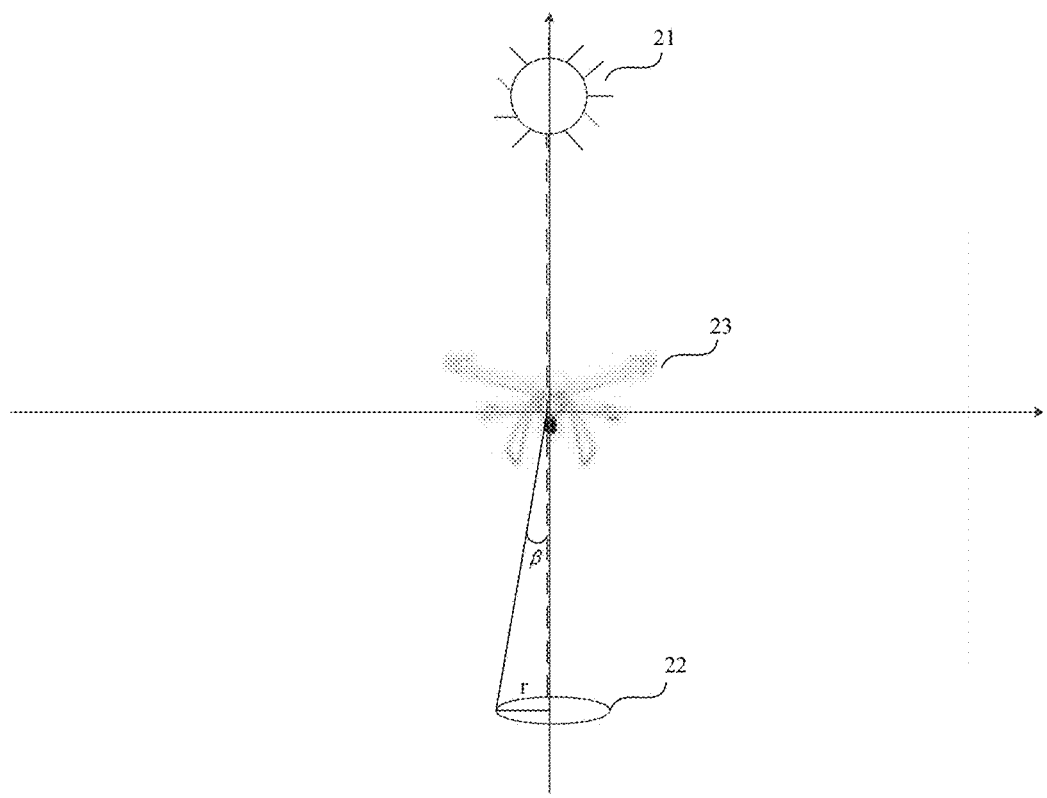
FIG. 2C is a schematic diagram showing another implementation environment involved in the photographing method for an intelligent flight device as shown in FIG. 2A.

Referring to FIG. 2C, when the light source angle is equal to zero, the shadow 22 on the horizontal plane, which is generated by blocking of the light emitted from the target light source 21 by the intelligent flight device 23, is right below the current position of the intelligent flight device 23.

In a second approach, when the light source angle is not equal to zero, a flight height is determined, and according to the light source angle and the flight height, the position of the shadow on the horizontal plane is determined. The flight height is a current height of the intelligent flight device from the horizontal plane.

Referring to FIG. 2B, the flight height is H. Because the light source angle $\alpha$ is known, the position d of the shadow on the horizontal plane may be determined according to the formula: $\tan \alpha = d/H$.

In a possible implementation, the intelligent flight device may determine the flight height using a distance measuring device such as an infrared sensor provided on the intelligent flight device, and embodiments of the present disclosure do not impose specific limitations on this.

In step 203, photographing is performed based on a current photographing angle of the intelligent flight device and the position of the shadow.

In a possible implementation, the intelligent flight device may determine the current photographing angle by an angle sensor provided on the intelligent flight device. That is, when the camera device of the intelligent flight device is rotated, the rotation angle of the camera device may be obtained using the angle sensor so as to obtain the current photographing angle.

Then, based on the current photographing angle and the position of the shadow, the intelligent flight device determines whether the position of the shadow is within a photographing range.

In a possible implementation, the determination of whether the position of the shadow is within a photographing range may be realized using the following procedure: determining whether a photographing direction corresponding to the current photographing angle is the same with the direction in which the position of the shadow is; if the photographing direction corresponding to the current photographing angle is different from the direction in which the position of the shadow is, determining that the position of the shadow is not within the photographing range; if the photographing direction corresponding to the current photographing angle is the same with the direction in which the position of the shadow is, determining whether an angle between the photographing angle and the vertical direction is smaller than the light source angle; if the angle between he photographing angle and the vertical direction is smaller than the light source angle, determining that the position of the shadow is within the photographing range; if the angle between the photographing angle and the vertical direction is greater than or equal to the light source angle, determining that the position of the shadow is not within the photographing range.

For example, referring to FIG. 2B, if the current photographing angle is towards right, because the position of the shadow (the position of the shadow is towards left on the horizontal plane) is opposite to the photographing direction corresponding to the photographing angle, it is apparent that the position of the shadow is not within the photographing range. On the contrary, if the photographing direction corresponding to the current photographing angle is the same with the position of the shadow, and the angle between the current photographing angle and the vertical direction is smaller than the light source angle, for example, if the current photographing angle is towards left and the angle between the current photographing angel and the vertical direction is equal to 20 degrees and the light source angle is equal to 60 degrees, the intelligent flight device may determine that the position of the shadow is within the photographing range.

It should be noted that in the above embodiments the intelligent flight device determines whether the position of the shadow is within the photographing range based on the current photographing angle and the position of the shadow, and in alternative embodiments, the intelligent flight device may send the current photographing angle and the position of the shadow to an intelligent device which as associated with the intelligent flight device, for example, a mobile phone or a smart remote control, so that the intelligent device may determine whether the position of the shadow is within the photographing range based on the current photographing angle and the position of the shadow, and embodiments of the present disclosure do not impose specific limitations on this.

If the position of the shadow is within the photographing range, the intelligent flight device should conduct photographing by avoiding the shadow. Specific implementations may include any one of the following.

In a first approach, if the position of the shadow is within the photographing range and is right below the current position of the intelligent flight device, photographing is performed downwards in the vertical direction to obtain a photographed picture; by performing of a preset image process on the photographed picture, a size of the intelligent flight device in the photographed picture is determined; based on the size of the intelligent flight device in the photographed picture and the flight height, a rotation angle which is an angle for avoiding the shadow is determined; and photographing is performed based on the rotation angle.

If the position of the shadow is right below the current position of the intelligent flight device, the camera device may be rotated by a certain angle to conduct photographing by avoiding the shadow. Referring to FIG. 2C, if the camera device is rotated by an angle of $\beta$ towards any direction, photographing the shadow into the photographed pictures or videos can be avoided. Thus, the angle $\beta$ needs to be determined.

Accordingly, in one or more embodiments of the present disclosure, the shadow is photographed to obtain the photographed picture. Because the intelligent flight device generally includes a plurality of arms which are used for fly assistance, and based on such feature, a circle region where the shadow is located may be obtained based on the shadow. As shown in FIG. 2C, the intelligent flight device may perform a preset image process on the photographed picture to determine the size of the intelligent flight device in the photographed picture, and thus the radius r of the circle region in the photographed picture where the intelligent flight device is can be obtained. Next, based on the radius r and the flight height H and $\tan \beta = r/H$, the intelligent flight device may determine the above rotation angle $\beta$.

It should be noted that the radius r and the flight height may be in different units, and thus in practical implementations unit conversion may be needed, and detailed descriptions are omitted here.

The above preset image process may include processes such as image normalization, or pixel point scan and the like, and embodiments of the present disclosure do not impose specific limitations on this.

In a second approach, if the position of the shadow is within the photographing range and the light source angle is not equal to zero, a target direction is determined according to the position of the shadow; the target direction is any direction other than an direction in which the position of the shadow is; from a plurality of preset shadow ranges, a preset shadow range corresponding to a shadow distance is determined, and the shadow distance is a horizontal distance between the position of the shadow and the intelligent flight device; from a plurality of preset rotation angles, a preset rotation angel corresponding to the preset shadow range is determined, and the plurality of preset rotation angles correspond to the plurality of preset shadow ranges one to one; photographing is performed based on the target direction and the preset rotation angle corresponding to the preset shadow range with the shadow distance.

Each of the preset shadow ranges may be set by users according to actual needs, or may be set by the intelligent flight device by default, and embodiments of the present disclosure do not impose specific limitations on this.

Also, each of the preset rotation angles may be set by users according to actual needs, or may be set by the intelligent flight device by default, and embodiments of the present disclosure do not impose specific limitations on this.

When the position of the shadow is within the photographing range and the light source angle is not equal to zero, if photographing is directly performed, the shadow may be photographed into the photographed pictures or videos, and thus the photographing angle may be adjusted. Referring to FIG. 2B, if the position of the shadow is as indicated by the reference number 22, the camera device needs to be rotated by a preset rotation angle towards any direction other than the direction in which the position of the shadow is.

Under such condition, the rotation angle is related to the horizontal distance between the position of the shadow and the intelligent flight device. The larger the horizontal distance between the position of the shadow and the intelligent flight device is, the smaller the shadow formed on the horizontal plane will be. Thus, the preset rotation angle may be set as a small value, that is, the photographing of the shadow into the photographed pictures or videos can be avoided by rotating only a small angle. On the contrary, the smaller the horizontal distance between the position of the shadow and the intelligent flight device is, the larger the shadow formed on the horizontal plane will be. Thus, in order to avoid the shadow to conduct photographing, a relatively large preset rotation angle is needed.

In a possible implementation, the one-to-one correspondence relationship between the plurality of preset shadow ranges and the plurality of preset rotation angles may be determined by users according to a large volume of test data, and the one-to-one correspondence relationship between the plurality of preset shadow ranges and the plurality of preset rotation angles may be stored in the intelligent flight device.

It should be noted that the target direction is any direction other than the direction in which the position of the shadow is, and users can set the target direction according to their preferences, and store the target direction in association with a user account; and then, based on the correspondence relationship between target directions and user accounts, the intelligent flight device may select a target direction corresponding to a user account and thus user experience may be improved.

In addition, in the above implementation, after the intelligent flight device is rotated by a preset angle towards the target direction, it is possible that the scenes and objects in the position of the shadow cannot be photographed. In order to continue photographing of the scenes and objects in the position of the shadow, after the intelligent flight device is rotated by the preset rotation angle towards the target direction, a photographing path may be planned according to the position of the shadow and the target direction. For example, referring to FIG. 2B, if the intelligent flight device is rotated by a preset rotation angle towards right in the horizontal direction, the intelligent flight device may fly towards left in the horizontal direction. At this time, the shadow of the intelligent flight device moves as the intelligent flight device flies, the position of the shadow moves accordingly towards left in the horizontal direction, and thus the intelligent flight device may photograph the scenes and objects in the position of the shadow.

It should be noted that after planning the photographing path, the intelligent flight device may send the photographing path to an intelligent device such as a mobile phone or a remote control and the like. After receiving the photographing path, the intelligent device may present the photographing path, so that users may know the next photograph path of the intelligent flight device, thereby improving user experience.

In embodiments of the present disclosure, an angle between a current position of a target light source which is a light source capable of generating a shadow of an intelligent flight device and a vertical direction is determined; according to the determined angle, a position of a shadow on the horizontal plane can be determined. Since the position of the shadow is determined, photographing can be performed based on a current photographing angle of the intelligent flight device and the position of the shadow. Thus, the technical solutions in the present disclosure can avoid incorporation of the shadow into the photographed pictures or videos, thereby improving the quality of photographing.

Figure 3:
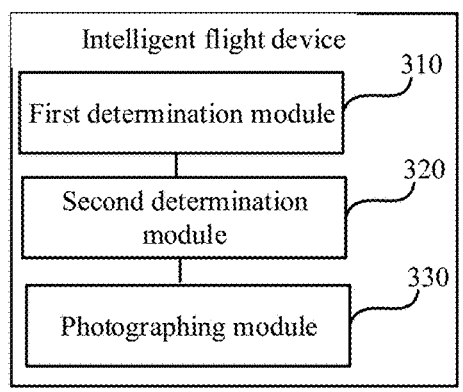
FIG. 3 is a block diagram showing an intelligent flight device according to another aspect of the disclosure.

FIG. 3 is a block diagram of an intelligent flight device according to another aspect of the disclosure. As shown in FIG. 3, the intelligent flight device includes a first determination module 310, a second determination module 320 and a photographing module 330.

The first determination module 310 is configured to determine a light source angle, the light source angle is an angle between a current beam direction of a target light source and a vertical direction, the target light source is a light source capable of generating a shadow of the intelligent flight device, and the vertical direction is a direction perpendicular to a horizontal plane.

The second determination module 320 is configured to, according to the light source angle determined by the first determination module 310, determine a position of a shadow on the horizontal plane, where the shadow is generated by the intelligent flight device that blocks the light emitted from the target light source.

The photographing module 330 is configured to perform photographing based on a current photographing angle of the intelligent flight device and the position of the shadow determined by the second determination module 320. For example, the photographing module 330 is configured to shoot a picture or a video based on the current photographing angle of the intelligent flight device and the position of the shadow.

Optionally, the first determination module 310 includes: a first determination sub-module configured to determine, based on a plurality of first preset angles, a plurality of light intensities by use of a configured light sensor and determine a first preset angle corresponding to a maximum light intensity as the light source angle, wherein the plurality of first preset angles correspond to the plurality of light intensities one to one. The determination module 310 may further include a second determination sub-module configured to determine, based on a plurality of second preset angles, a plurality of exposures, and determine a second preset angle corresponding to a maximum exposure as the light source angle, wherein the plurality of second preset angles correspond to the plurality of exposures one to one.

Optionally, the second determination module 320 includes: a third determination sub-module configured to, if the light source angle is equal to zero, determine that the shadow on the horizontal plane is right below a current position of the intelligent flight device. The second determination module 320 may further include a fourth determination sub-module configured to, if the light source angle is not equal to zero, determine a flight height, and according to the light source angle and the flight height, determine the position of the shadow on the horizontal plane, where the flight height is a current height of the intelligent flight device from the horizontal plane.

Optionally, the photographing module 330 includes: a determination sub-module configured to, based on the current photographing angle and the position of the shadow, determine whether the position of the shadow is within a photographing range. The photographing module 330 may further include: a first photographing sub-module, a fifth determination sub-module, a sixth determination sub-module, and a second photographing sub-module.

The first photographing sub-module is configured to perform photographing downwards in the vertical direction to obtain a photographed picture if the position of the shadow is within the photographing range and is right below the current position of the intelligent flight device. The fifth determination sub-module is configured to, by performing of a preset image process on the photographed picture, determine a size of the intelligent flight device in the photographed picture. The sixth determination sub-module is configured to, based on the size of the intelligent flight device in the photographed picture and the flight height, determine a rotation angle which is an angle for avoiding the shadow. The second photographing sub-module is configured to perform photographing based on the rotation angle.

Optionally, the photographing module 330 further includes: a seventh determination sub-module configured to, if the position of the shadow is within the photographing range and the light source angle is not equal to zero, determine a target direction according to the position of the shadow, where the target direction is any direction other than an direction in which the position of the shadow is. The photographing module 330 may further include an eighth determination sub-module configured to determine, from a plurality of preset shadow ranges, a preset shadow range corresponding to a shadow distance, wherein the shadow distance is a horizontal distance between the position of the shadow and the intelligent flight device. The photographing module 330 may further include a ninth determination sub-module configured to determine, from a plurality of preset rotation angles, a preset rotation angel corresponding to the preset shadow range, wherein the plurality of preset rotation angles correspond to the plurality of preset shadow ranges one to one.

In some examples, the second photographing sub-module is configured to: perform photographing based on the target direction and the preset rotation angle corresponding to the preset shadow range with the shadow distance.

In the present disclosure, an angle between a current position of a target light source which is a light source capable of generating a shadow of an intelligent flight device and a vertical direction is determined; according to the determined angle, a position of a shadow on the horizontal plane can be determined. Since the position of the shadow is determined, photographing can be performed based on a current photographing angle of the intelligent flight device and the position of the shadow. Thus, the technical solutions in the embodiment can avoid incorporation of the shadow into the photographed pictures or videos, thereby improving the quality of photographing.

With respect to the device embodiments, the specific manners for the individual modules to perform operations can be found in the previous detailed descriptions regarding the method embodiments and repeated descriptions are omitted here.

Figure 4:
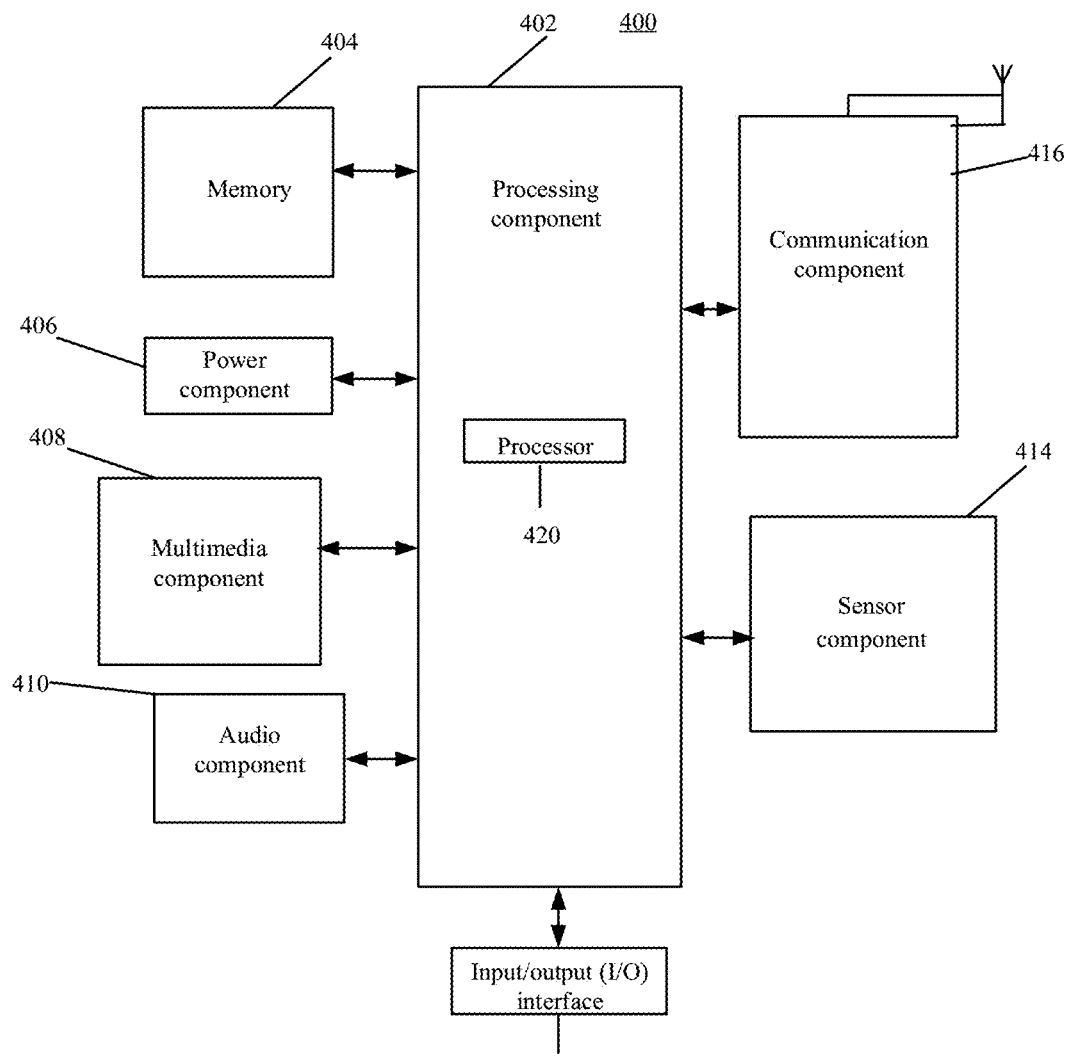
FIG. 4 is a block diagram showing an intelligent flight device 400 according to another aspect of the disclosure.

FIG. 4 is a block diagram of in intelligent flight device 400 according to an aspect of the disclosure. For example, the intelligent flight device may be an unmanned camera and so on.

Referring to FIG. 4, the intelligent flight device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the intelligent flight device 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the intelligent flight device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the intelligent flight device 400. The power component 406 may include a power management system, one or more power sources, and any other components associated with the generation, management, and distribution of power in the intelligent flight device 400.

The multimedia component 408 includes a screen providing an output interface between the intelligent flight device 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and/or the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the intelligent flight device 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the intelligent flight device 400. For instance, the sensor component 414 may detect an open/closed status of the intelligent flight device 400, relative positioning of components, e.g., the display and the keypad, of the intelligent flight device 400, a change in position of the device 400 or a component of the intelligent flight device 400, a presence or absence of user contact with the intelligent flight device 400, an orientation or an acceleration/deceleration of the intelligent flight device 400, and a change in temperature of the intelligent flight device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the intelligent flight device 400 and other devices. The intelligent flight device 400 can access a wireless network based on a communication standard, such as WiFi, 2G, or 3G, or a combination thereof. In one aspect of the disclosure, the communication component 416 receives a broadcast signal or broadcast associated information from an external broadcast management system via a broadcast channel. In one aspect of the disclosure, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the intelligent flight device 400 may be implemented with one or more circuitry, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The intelligent flight device 400 may use the circuitry in combination with the other hardware or software components for performing the above described methods. Each module, sub-module, unit, or sub-unit in the disclosure may be implemented at least partially using the one or more circuitry.

In some embodiments, there is also provided a non-transitory computer-readable storage medium including instructions, such as the memory 404 including instructions, the above instructions are executable by the processor 420 in the intelligent flight device 400, for performing the above-described methods. For example, the non-transitory computer-readable storage medium may be a ROM, a RAM, a CD-ROM, a magnetic tape, a floppy disc, an optical data storage device, and the like.

There is provided a non-transitory computer-readable storage medium, when the instructions in the storage medium are executed by the processor of the intelligent flight device 400, the intelligent flight device 400 is caused to perform the photographing method for the intelligent flight device as shown in FIG. 1 or 2A.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for photographing by an intelligent flight device, comprising:

determining a light source angle between a current beam direction from a target light source and a vertical direction, the target light source is a light source capable of generating a shadow of the intelligent flight device, and the vertical direction is a direction perpendicular to a horizontal plane;

according to the light source angle, determining a position of the shadow of the intelligent flight device on the horizontal plane; and shooting a picture or a video based on a current photographing angle of the intelligent flight device and the position of the shadow so that the shadow is outside of the picture or the video, wherein determining the position of the shadow on the horizontal plane comprises:

when the light source angle is equal to zero, determining that the shadow on the horizontal plane is right below a current position of the intelligent flight device; and when the light source angle is not equal to zero, determining a flight height, and according to the light source angle and the flight height, determining the position of the shadow on the horizontal plane, wherein the flight height is a current height of the intelligent flight device from the horizontal plane.

2. The method according to claim 1, wherein determining the light source angle comprises:

determining, based on a plurality of first preset angles, a plurality of light intensities by use of a configured light sensor and determining a first preset angle corresponding to a maximum light intensity as the light source angle, wherein the plurality of first preset angles correspond to the plurality of light intensities one to one.

3. The method according to claim 1, wherein determining the light source angle comprises:

determining, based on a plurality of second preset angles, a plurality of exposures, and determining a second preset angle corresponding to a maximum exposure as the light source angle, wherein the plurality of second preset angles correspond to the plurality of exposures one to one.

4. The method according to claim 1, wherein shooting the picture or the video based on the current photographing angle of the intelligent flight device and the position of the shadow, comprises:

based on the current photographing angle and the position of the shadow, determining whether the position of the shadow is within a photographing range;

when the position of the shadow is within the photographing range and is right below the current position of the intelligent flight device, shooting a picture or a video downwards in the vertical direction to obtain a photographed picture;

by performing a preset image process on the photographed picture, determining a size of the intelligent flight device in the photographed picture;

based on the size of the intelligent flight device in the photographed picture and the flight height, determining a rotation angle which is an angle for avoiding the shadow; and shooting the picture or the video based on the rotation angle.

5. The method according to claim 4, wherein determining whether the position of the shadow is within the photographing range based on the current photographing angle and the position of the shadow, comprises:

when the position of the shadow is within the photographing range and the light source angle is not equal to zero, determining a target direction according to the position of the shadow, wherein the target direction is any direction other than an direction in which the position of the shadow is;

determining, from a plurality of preset shadow ranges, a preset shadow range corresponding to a shadow distance, wherein the shadow distance is a horizontal distance between the position of the shadow and the intelligent flight device;

determining, from a plurality of preset rotation angles, a preset rotation angel corresponding to the preset shadow range, wherein the plurality of preset rotation angles correspond to the plurality of preset shadow ranges one to one;

wherein shooting a picture or a video based on the current photographing angle and the position of the shadow comprises:

shooting the picture or the video based on the target direction and the preset rotation angle corresponding to the preset shadow range with the shadow distance.

6. An intelligent flight device, comprising:

a processor; and a memory for storing instructions executable by the processor;

wherein the processor is configured to:

determine a light source angle, wherein the light source angle is an angle between a current beam direction of a target light source and a vertical direction, the target light source is a light source capable of generating a shadow of the intelligent flight device, and the vertical direction is a direction perpendicular to a horizontal plane;

according to the light source angle, determine a position of the shadow on the horizontal plane;

perform photographing based on a current photographing angle of the intelligent flight device and the position of the shadow;

when the light source angle is equal to zero, determine that the shadow on the horizontal plane is right below a current position of the intelligent flight device; and when the light source angle is not equal to zero, determine a flight height, and according to the light source angle and the flight height, determine the position of the shadow on the horizontal plane, wherein the flight height is a current height of the intelligent flight device from the horizontal plane.

7. The intelligent flight device according to claim 6, wherein the processor is configured to perform one of the following:

determining, based on a plurality of first preset angles, a plurality of light intensities by use of a configured light sensor and determining a first preset angle corresponding to a maximum light intensity as the light source angle, wherein the plurality of first preset angles correspond to the plurality of light intensities one to one.

8. The intelligent flight device according to claim 6, wherein the processor is configured to perform one of the following:

determining, based on a plurality of second preset angles, a plurality of exposures, and determining a second preset angle corresponding to a maximum exposure as the light source angle, wherein the plurality of second preset angles correspond to the plurality of exposures one to one.

9. The intelligent flight device according to claim 6, wherein the processor is configured to:

based on the current photographing angle and the position of the shadow, determine whether the position of the shadow is within a photographing range;

when the position of the shadow is within the photographing range and is right below the current position of the intelligent flight device, perform photographing downwards in the vertical direction to obtain a photographed picture;

by perform a preset image process on the photographed picture, determine a size of the intelligent flight device in the photographed picture;

based on the size of the intelligent flight device in the photographed picture and the flight height, determine a rotation angle which is an angle for avoiding the shadow; and perform photographing based on the rotation angle.

10. The intelligent flight device according to claim 9, wherein the processor is configured to:

when the position of the shadow is within the photographing range and the light source angle is not equal to zero, determine a target direction according to the position of the shadow, wherein the target direction is any direction other than a direction in which the position of the shadow is;

determine, from a plurality of preset shadow ranges, a preset shadow range corresponding to a shadow distance, wherein the shadow distance is a horizontal distance between the position of the shadow and the intelligent flight device;

determine, from a plurality of preset rotation angles, a preset rotation angel corresponding to the preset shadow range, wherein the plurality of preset rotation angles correspond to the plurality of preset shadow ranges one to one; and perform photographing based on the target direction and the preset rotation angle corresponding to the preset shadow range with the shadow distance.

11. A non-transitory computer-readable storage medium having stored therein instructions that, when executed by a processor of an intelligent flight device, causes the intelligent flight device to perform a photographing method, the method comprising:

determining a light source angle, wherein the light source angle is an angle between a current beam direction of a target light source and a vertical direction, the target light source is a light source capable of generating a shadow of the intelligent flight device, and the vertical direction is a direction perpendicular to a horizontal plane;

according to the light source angle, determining a position of the shadow on the horizontal plane; and shooting a picture or a video based on a current photographing angle of the intelligent flight device and the position of the shadow, wherein determining the position of the shadow on the horizontal plane comprises:

when the light source angle is equal to zero, determining that the shadow on the horizontal plane is right below a current position of the intelligent flight device; and when the light source angle is not equal to zero, determining a flight height, and according to the light source angle and the flight height, determining the position of the shadow on the horizontal plane, wherein the flight height is a current height of the intelligent flight device from the horizontal plane.

* * * * *